United States Patent
Surnilla et al.

(10) Patent No.: US 9,683,500 B2
(45) Date of Patent: *Jun. 20, 2017

(54) METHOD AND SYSTEM FOR CONTROL OF AN EGR VALVE DURING LEAN OPERATION IN A BOOSTED ENGINE SYSTEM

(71) Applicant: Ford Global Technologies, LLC, Dearborn, MI (US)

(72) Inventors: Gopichandra Surnilla, West Bloomfield, MI (US); Todd Anthony Rumpsa, Saline, MI (US); James Alfred Hilditch, Canton, MI (US); Timothy Joseph Clark, Livonia, MI (US); Ralph Wayne Cunningham, Milan, MI (US); Julia Helen Buckland, Commerce Township, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/752,289

(22) Filed: Jun. 26, 2015

(65) Prior Publication Data

US 2015/0292424 A1 Oct. 15, 2015

Related U.S. Application Data

(63) Continuation of application No. 14/063,852, filed on Oct. 25, 2013, now Pat. No. 9,074,541.

(51) Int. Cl.
*F02D 41/00* (2006.01)
*F02D 41/14* (2006.01)
(Continued)

(52) U.S. Cl.
CPC ..... *F02D 41/0077* (2013.01); *F02D 13/0265* (2013.01); *F02D 41/005* (2013.01);
(Continued)

(58) Field of Classification Search
CPC ............. F02D 13/0265; F02D 41/0007; F02D 41/005; F02D 41/0052; F02D 41/006;
(Continued)

(56) References Cited

U.S. PATENT DOCUMENTS

| 4,671,107 A | 6/1987 | Chiesa et al. |
| 5,884,476 A | 3/1999 | Hirota et al. |

(Continued)

FOREIGN PATENT DOCUMENTS

| JP | 10141147 A | 5/1998 |
| JP | 2001165000 A | 6/2001 |
| WO | 2013077155 A1 | 5/2013 |

*Primary Examiner* — Audrey K Bradley
(74) *Attorney, Agent, or Firm* — Julia Voutyras; McCoy Russell LLP (57) ABSTRACT

Methods and systems are provided for reducing EGR estimation errors during lean engine operating conditions. During lean engine operation, EGR is disabled if the estimated exhaust air-fuel ratio becomes leaner than a lean threshold. The lean threshold is adjusted based on an upper limit of EGR errors that may be tolerated by the engine at a given engine speed and load.

19 Claims, 3 Drawing Sheets (51) Int. Cl.
  *F02M 26/06* (2016.01)
  *F02D 13/02* (2006.01)
  *F02M 35/10* (2006.01)
  *F02M 26/05* (2016.01)

(52) U.S. Cl.
  CPC ....... *F02D 41/006* (2013.01); *F02D 41/0007* (2013.01); *F02D 41/0052* (2013.01); *F02D 41/0072* (2013.01); *F02D 41/1439* (2013.01); *F02D 41/1454* (2013.01); *F02D 41/1456* (2013.01); *F02D 41/144* (2013.01); *F02M 26/05* (2016.02); *F02M 26/06* (2016.02); *F02M 35/10222* (2013.01); *Y02T 10/22* (2013.01); *Y02T 10/47* (2013.01)

(58) Field of Classification Search
  CPC ............ F02D 41/0072; F02D 41/0077; F02D 41/1439; F02D 41/144; F02D 41/1454; F02D 41/1456; Y02T 10/22; Y02T 10/47; F02M 26/05; F02M 26/06; F02M 35/10222
  See application file for complete search history.

(56) References Cited

U.S. PATENT DOCUMENTS

| | | |
|---|---|---|
| 7,047,742 B2 | 5/2006 | Kono et al. |
| 7,275,374 B2 | 10/2007 | Stewart et al. |
| 7,296,561 B2 | 11/2007 | Shirakawa et al. |
| 8,272,215 B2 | 9/2012 | Shu et al. |
| 8,352,164 B2 | 1/2013 | Leone et al. |
| 2003/0209234 A1 | 11/2003 | Kinomura et al. |
| 2007/0039598 A1 | 2/2007 | Wakayama et al. |
| 2008/0041034 A1 | 2/2008 | Hosoi |
| 2013/0104544 A1 | 5/2013 | Schilling et al. |
| 2015/0075502 A1 | 3/2015 | Surnilla et al. |
| 2015/0075503 A1 | 3/2015 | Surnilla et al. |
| 2015/0101326 A1 | 4/2015 | Surnilla et al. |
| 2015/0101327 A1 | 4/2015 | Clark et al. |
| 2015/0101564 A1 | 4/2015 | Surnilla et al. |

METHOD AND SYSTEM FOR CONTROL OF AN EGR VALVE DURING LEAN OPERATION IN A BOOSTED ENGINE SYSTEM

CROSS REFERENCE TO RELATED APPLICATIONS

The present application is a continuation of U.S. patent application Ser. No. 14/063,852, entitled "METHOD AND SYSTEM FOR CONTROL OF AN EGR VALVE DURING LEAN OPERATION IN A BOOSTED ENGINE SYSTEM," filed on Oct. 25, 2013, the entire contents of which are hereby incorporated by reference for all purposes.

FIELD

The present application relates to control of an EGR valve during lean operation in a boosted vehicle engine system.

BACKGROUND AND SUMMARY

Engine systems may be configured with exhaust gas recirculation (EGR) systems via which at least a portion of the exhaust gas is recirculated to the engine intake. Various sensors may be coupled in the engine system to estimate the amount of EGR being delivered to the engine. These may include, for example, various temperature, pressure, oxygen, and humidity sensors coupled to the engine intake manifold and/or the exhaust manifold.

As such, EGR levels may be adjusted based on various conditions such as combustion air-fuel ratio and exhaust emissions levels. One example of such an adjustment is shown by Schilling et al in US 2013/0104544. Therein, during lean operation, an amount of EGR recirculated is increased so as to improve exhaust NOx emissions.

However, the inventors herein have identified potential issues with such an approach. As an example, engine control may be degraded due to incorrect EGR estimation. Specifically, during lean to very lean engine operation, there may be significant amounts of fresh air in the exhaust, and therefore in the EGR. If EGR delivery is estimated by a delta pressure sensor across the EGR valve, or across a fixed orifice of the EGR system (or an EGR MAF sensor), the sensor may incorrectly interpret the flow of fresh air as exhaust residuals, and EGR may be overestimated. As a result, adjustments to spark timing, throttle position, and other actuators based on this EGR estimate may be scheduled incorrectly leading to potential combustion and torque control issues. As another example, in engine systems where the EGR is estimated by an intake oxygen sensor, the fresh air may lead to an EGR measurement error that may be misinterpreted as reduced engine dilution, and EGR may be underestimated. In addition to incorrect engine control, this may also lead to OBD issues due to an EGR monitor noting a discrepancy between the expected EGR valve flow versus the EGR measured by the intake oxygen sensor. In still other systems, such as MAF systems, the fresh air through the EGR system may be unaccounted for, leading to aircharge calculation errors which may lead to fueling and torque errors.

The inventors herein have recognized that during lean operations where there is substantial fresh air in the exhaust, it may be more efficient to not deliver any EGR rather than delivering an incorrect amount of EGR. In other words, the benefits of EGR on emissions and fuel efficiency may not outweigh the fuel penalty and performance penalty incurred due to incorrect EGR estimation and delivery. Thus in one example, some of the above issues may be at least partly addressed by a method for an engine comprising: while operating an engine with an air-fuel ratio adjusted to be leaner than stoichiometry, in response to exhaust air-fuel ratio being leaner than a threshold, closing an EGR valve.

As an example, during lean engine operation, a threshold may be set based on engine speed and load. The threshold may be based on a maximum amount of EGR error that may be tolerated. The tolerable EGR error may be used to calculate a degree of leanness that is acceptable. In response to the exhaust air-fuel ratio being leaner than the threshold, EGR delivery may be disabled by closing the EGR valve. Herein, the EGR may be a low pressure EGR and the EGR valve may be an EGR valve coupled in the low pressure EGR system. The valve may be maintained closed at least until engine operation has returned to be richer than the lean threshold, such as when engine operation at stoichiometry is resumed. Thereafter, EGR may be enabled.

In this way, issues associated with incorrect EGR estimation and misdiagnosis of an EGR system by an EGR monitor can be reduced. As such, this not only reduces combustion issues related to incorrect spark and torque control, but also reduces costs associated with failed EGR monitors. By removing the conditions that could cause false reading of EGR measurement, drivability and fuel economy are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
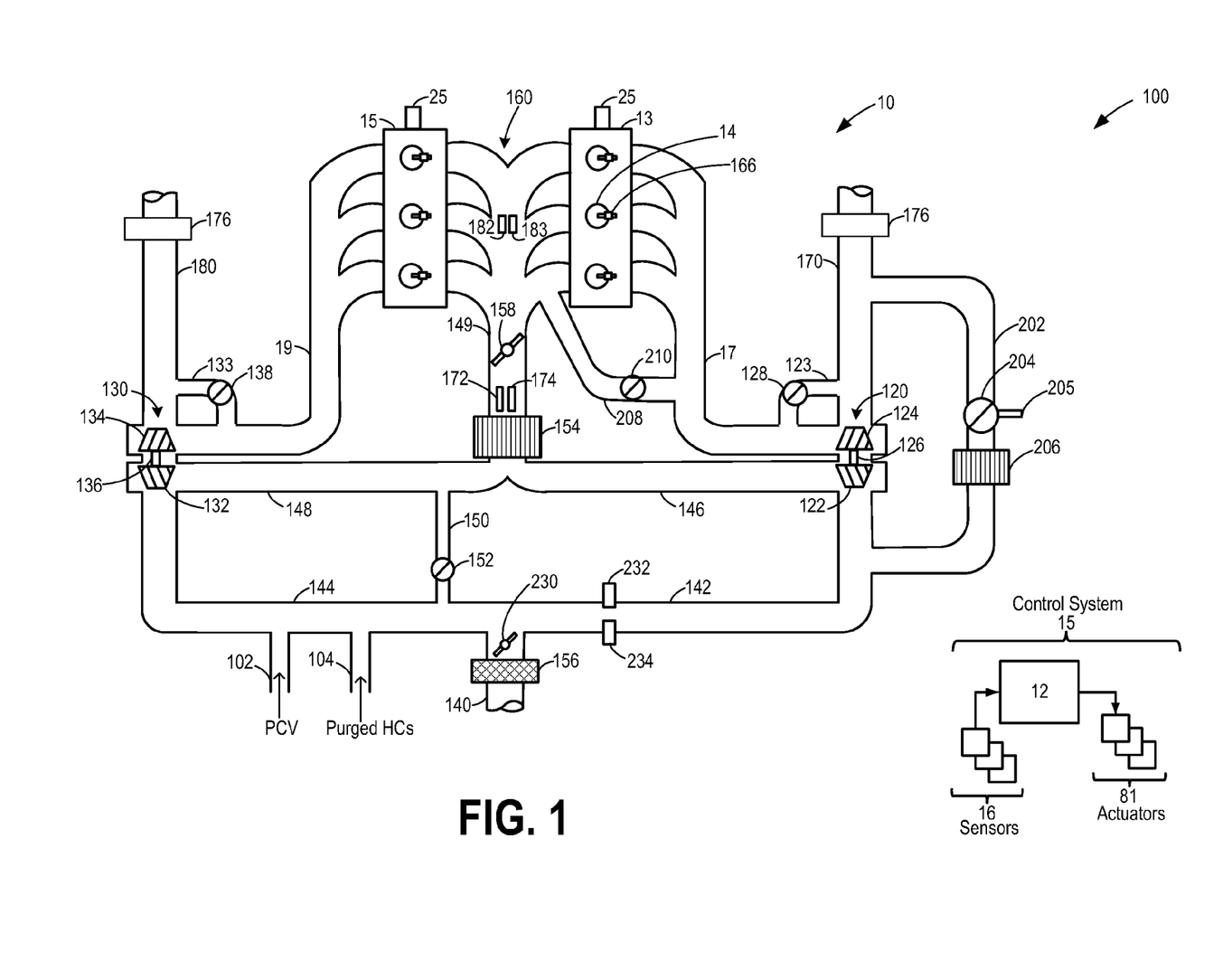
FIG. 1 shows a schematic depiction of an example engine system including an intake humidity sensor.

Methods and systems are provided for disabling EGR during selected lean engine operating conditions in an engine system, such as the system of FIG. 1. An engine controller may be configured to perform a control routine, such as the routine of FIG. 2, to disable EGR when engine combustion is determined to be leaner than a threshold, where the threshold is adjusted based on engine speed and load. An example adjustment is shown with reference to FIG. 3. In this way, misdiagnosis and miscalculation of EGR is reduced.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively recirculate flow through the compressor stages of turbochargers 120 and 130 via recirculation passage 150. As one example, anti-surge valve 152 can open to enable flow through recirculation passage 150 when the intake air pressure upstream of the compressors attains a threshold value.

Air duct 149 may further include an intake gas oxygen sensor 172. In one example, the oxygen sensor is a UEGO sensor. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 172 is positioned upstream of throttle 158 and downstream of charge air cooler 154. However, in alternate embodiments, the oxygen sensor may be positioned upstream of the CAC. A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices 176, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

In some examples, an EGR monitor 205 may be coupled to the low pressure EGR system, specifically, at the LP-EGR valve 204. In one example, EGR monitor 205 may measure a delta pressure across the LP-EGR valve to infer an EGR flow. The monitor may then diagnose the LP-EGR system based on discrepancies between the EGR flow expected based on the delta pressure and an estimated EGR flow, such as based on intake oxygen sensor 172. EGR monitor may be coupled to controller 12 and may include a counter. A count of the EGR monitor may be incremented in response to an EGR system error. When the count exceeds a threshold, a diagnostic code may be set. Alternatively, the EGR monitor may include reading a delta pressure over an orifice separate from the EGR valve or an EGR hot-wire or hot-film anemometer mass flow meter.

Engine 10 may further include a first high-pressure EGR loop 208 for recirculating at least some exhaust gas from the first parallel exhaust passage 17, upstream of the turbine 124, to the first branched parallel intake passage 146, downstream of the compressor 122. Likewise, the engine may include a second high-pressure EGR loop (not shown) for recirculating at least some exhaust gas from the second parallel exhaust passage 18, upstream of the turbine 134, to the second branched parallel intake passage 148, downstream of the compressor 132. EGR flow through HP-EGR loops 208 may be controlled via HP-EGR valve 210. As such, HP-EGR may be injected downstream of the engine throttle 150 to improve the flow capability under some operating conditions.

A PCV port 102 may be configured to deliver crankcase ventilation gases (blow-by gases) to the engine intake manifold along second parallel intake passage 144. In some embodiments, flow of PCV air through PCV port 102 (e.g., PCV flow) may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Alternatively, they may be positioned downstream of the humidity sensor. Pressure sensor 234 may be configured to estimate a pressure of the intake air. In some embodiments, a temperature sensor may also be included in the same parallel intake passage, downstream or upstream of the EGR throttle valve 230.

As such, intake oxygen sensor 172 may be used for estimating an intake oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

In one example, a zero point estimation of the intake oxygen sensor may be performed during idle conditions where intake pressure fluctuations are minimal and when no PCV or purge air is ingested into the engine. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

Returning to FIG. 1, the position of intake and exhaust valves of each cylinder 14 may be regulated via hydraulically actuated lifters coupled to valve pushrods, or via a cam profile switching mechanism in which cam lobes are used. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, EGR monitor 205, and intake air oxygen sensor 172. In some examples, common intake passage 149 may further include a throttle inlet temperature sensor for estimating a throttle air temperature (TCT). In other examples, one or more of the EGR passages may include pressure, temperature, and hot-wire or hot-film anemometer flow sensors, for determining EGR flow characteristics. As another example, actuators 81 may include fuel injector 166, HP-EGR valve 210, LP-EGR valve 204, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. An example control routine is described herein with regard to FIG. 2.

Figure 2:
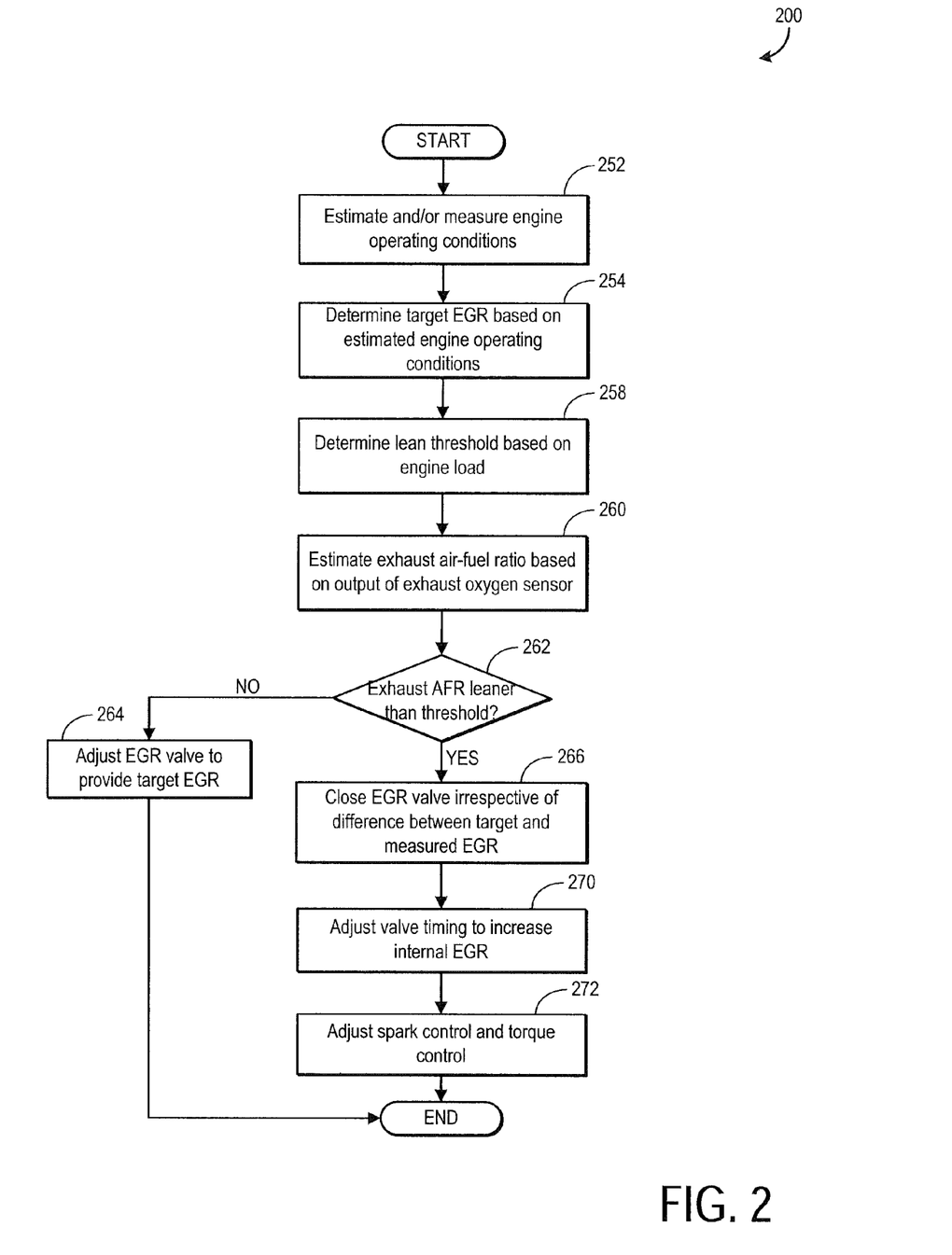
FIG. 2 shows a high level flow chart for disabling EGR in response to an exhaust air-fuel ratio becoming leaner than a threshold.

Now turning to FIG. 2, an example routine 200 is shown for disabling EGR during selected lean engine operating conditions. The method allows issues associated with the misdiagnosis of an EGR system as well as EGR estimation errors to be reduced.

At 252, the routine includes estimating and/or measuring engine operating conditions. These may include, for example, engine speed, load, barometric pressure, driver torque demand, engine temperature, NOx levels, air-fuel ratio, etc. At 254, based on the estimated operating conditions, a target EGR may be determined. This may include, for example, determining an EGR flow rate, amount, temperature, etc. Further, this may include determining an amount of high pressure EGR, low pressure EGR or a ratio thereof. Accordingly, an EGR valve position may be adjusted to provide the target EGR.

In one example, EGR may be flowing while the engine is operating with an air-fuel ratio adjusted to be leaner than stoichiometry. The lean engine operation may be due to the engine speed-load conditions to reduce pumping losses or during deceleration fuel shutoff (DFSO). Other circumstances can create extra air in the exhaust such as blow through. As such, the engine may be operating boosted and fueled via direct injection. The air-fuel ratio adjusted to be leaner than stoichiometry may be a combustion air and fuel combusting in a cylinder of the engine, the combustion initiated via spark-ignition, resulting in excess air in the exhaust and hence, in the EGR.

At 258, a lean threshold may be determined based on the exhaust UEGO sensor reading. The lean threshold may reflect an upper limit of lean operation. Beyond the lean threshold, EGR estimation and diagnosis errors may occur. Specifically, if the engine is operated at an exhaust air-fuel ratio leaner than the lean threshold, the excess oxygen present in the exhaust may cause false readings of EGR measurement and EGR system errors. For example, if the exhaust includes an amount of fresh air, the EGR will also include fresh air from the exhaust side. In engine systems where an EGR monitor measures or monitors the EGR flow by measuring a delta pressure across the valve or across a fixed orifice or EGR MAF sensor, the additional fresh air may be interpreted as EGR. Based on this information, spark timing, throttle opening, and other actuators may be scheduled incorrectly leading to combustion and/or torque control issues. In engine systems where the EGR concentration is measured by an intake oxygen sensor, the fresh air may lead to an EGR measurement error. The error may cause the oxygen sensor output to be interpreted as a drop in dilution, or as a low EGR flowing condition. This in turn can cause diagnostic issues due to a discrepancy between the expected EGR valve flow versus the EGR measured by the intake oxygen sensor. In MAF systems, the fresh air through the EGR system may be unaccounted for, leading to air charge calculation errors. These, in turn, may lead to fueling and torque errors.

To reduce these errors, as elaborated below, if the lean engine operation exceeds a lean threshold, EGR may be disabled. In other words, during conditions where the exhaust oxygen concentration exceeds, or is expected to exceed, the calibratable lean threshold, EGR may be disabled. As such, the lean threshold may be determined by the maximum allowable EGR measurement error and/or EGR flow diagnostic detection requirement. In one example the flow based monitor may over-estimate the dilution and lead to a modification of spark timing or throttle angle that reduces fuel efficiency, degrades combustion stability or increases emissions. In another example, the difference between the flow based monitor and the EGR dilution measurement may exceed a threshold and be incorrectly interpreted as a sensor fault or other EGR system fault. As one example, adjusting or calibrating the threshold (based on the engine speed/load) includes estimating an EGR error upper limit that can be tolerated at the current engine speed/load, estimating an air error upper limit based on the EGR error upper limit, and calculating the threshold based on the air error upper limit. Thus, the threshold may be increased as the engine speed/load increases.

At 260, the routine includes estimating an exhaust air-fuel ratio. For example, the exhaust (or combustion) air-fuel ratio may be estimated by the exhaust oxygen sensor. As previously discussed, the intake oxygen sensor may be configured to estimate an EGR flow to the engine based on a change in oxygen concentration. The exhaust oxygen sensor is positioned upstream of an exhaust emission control device of the exhaust manifold (e.g., an exhaust three-way catalyst).

At 262, it may be determined if the estimated exhaust air-fuel ratio is leaner than the threshold. If not, then at 264, EGR valve control may be adjusted to provide the target EGR. Herein, EGR valve opening/closing is adjusted based on differences between the estimated EGR and the target EGR. This includes increasing an opening of the EGR valve to increase EGR delivery if the estimated EGR rate is lower than the target EGR rate and decreasing the opening of the EGR valve to decrease EGR delivery if the estimated EGR rate is higher than the target EGR rate. In addition to EGR control, spark control and torque control based on EGR may be maintained.

In comparison, in response to the exhaust air-fuel ratio being leaner than the threshold while operating the engine with an air-fuel ratio that is leaner than stoichiometry, at 266, the routine includes closing the EGR valve. Closing the EGR valve includes fully closing the EGR valve and fully sealing the EGR valve against its seat. As such, the EGR valve may be coupled to a low pressure EGR passage such that by closing the EGR valve, low pressure EGR may be disabled. Closing the EGR valve further includes fully closing the EGR valve irrespective of a difference between EGR estimated (e.g., by the intake oxygen sensor) and a target EGR (e.g., based on the engine speed and load).

Next, at 270, the routine includes adjusting a valve timing to increase internal EGR, for example to compensate for the drop in external EGR. Adjusting the valve timing includes adjusting one or more of an intake valve timing, an exhaust valve timing, and an amount of valve overlap. For example, the adjusting may include advancing intake cam timing and/or retarding exhaust valve timing to increase valve overlap, replacing external EGR with internal EGR, or otherwise changing cam positions to improve fuel economy and/or emissions.

At 272, spark control and torque control of the engine may be adjusted to account for higher levels of internal EGR and the cessation of external EGR. For example, the spark may be retarded if the adjusted cam position results in less total residual dilution. The throttle may be adjusted to provide the requested torque at the adjusted cam position from step 270. In some examples, the EGR may be maintained closed until the exhaust air-fuel ratio is outside the lean threshold. For example, the EGR valve may be opened when the air-fuel ratio is at or below the threshold. In one example, the EGR valve may be opened responsive to stoichiometric engine operation.

In one example, an engine method comprises flowing low pressure EGR; and in response to an exhaust air-fuel ratio becoming leaner than a threshold based on engine speed and load, disabling the EGR. Herein, each of the flow rate of the flowing EGR and the exhaust air-fuel ratio are estimated by intake and exhaust oxygen sensors, respectively. The method further comprises, while flowing low pressure EGR, incrementing a counter of an EGR monitor responsive to an indication of EGR error, and while disabling the EGR, resetting or suspending the counter of the EGR monitor.

In another example, an engine system comprises an engine with an intake and an exhaust; an EGR system including an EGR passage for recirculating exhaust residuals from the exhaust to the intake via an EGR valve; and an EGR monitor including a counter. The engine system further includes an intake oxygen sensor coupled to the intake, upstream of an intake throttle and downstream of an outlet of the EGR passage, the sensor configured to estimate EGR. An engine controller may be configured with computer readable instructions for: flowing EGR based on engine speed and load and during the flowing, incrementing the counter in response to an indication of EGR system error. Then, in response to an exhaust air-fuel ratio rising above a lean threshold, the controller may close the EGR valve. Herein, closing the EGR valve includes fully closing the EGR valve irrespective of a difference between EGR estimated by the intake oxygen sensor and a target EGR based on the engine speed and load.

It will be appreciated that while the routine of FIG. 2 shows disabling EGR during conditions when engine operation is too lean, EGR may be similarly disabled during other conditions where the exhaust has too much fresh air, such as when fuel injectors are disabled and the exhaust oxygen concentration is higher than a calibrated threshold. This may include, for example, deceleration fuel shut-off conditions, as well as individual cylinder fuel shut-off conditions.

Figure 3:
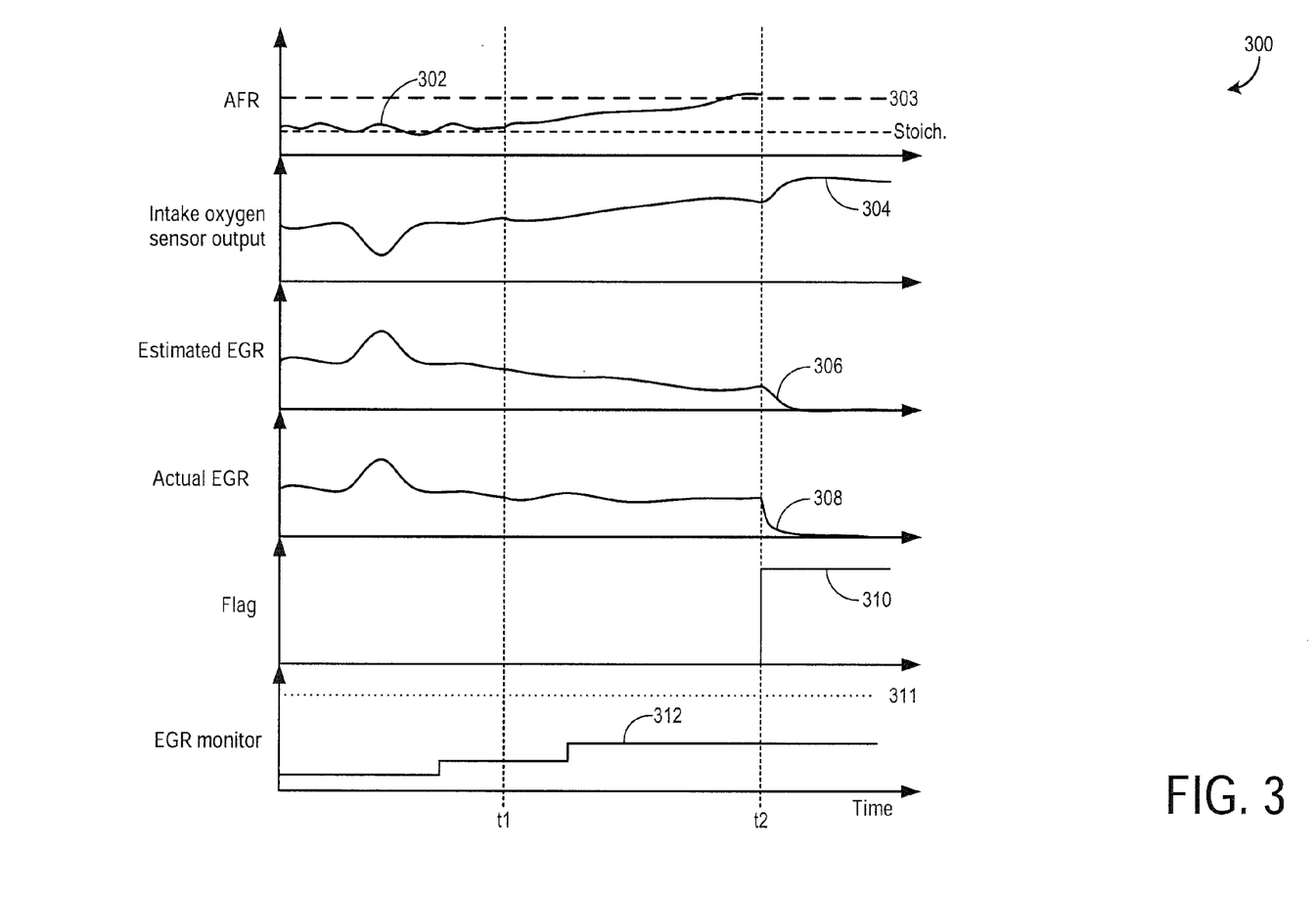
FIG. 3 shows an example disablement of EGR during selected lean operating conditions.

Now turning to FIG. 3, an example EGR disablement during selected engine lean conditions is shown. Map 300 depicts changes in an exhaust air-fuel ratio (AFR) at plot 302, changes in the output of an intake oxygen sensor at plot 304, estimated EGR (based on the output of the intake oxygen sensor) at plot 306, actual EGR at plot 308, an EGR enablement flag at plot 310, and an EGR monitor counter at plot 312.

Prior to t1, the engine may be operating at or around stoichiometry (plot 302). Between t0 and t1, the EGR being delivered to the engine may be estimated based on the output of the intake oxygen sensor. For example, in response to a drop in oxygen concentration (half way between t0 and t1), a rise in engine dilution from the delivery of residuals may be inferred and the estimated EGR may be accordingly increased (compare plot 304 and 306). Herein, the estimated EGR may correctly reflect the actual EGR (plot 308).

Also between t0 and t1, an EGR monitor may be monitoring the EGR system. Specifically, the EGR monitor may monitor changes in the EGR valve position and the corresponding changes in EGR delivery (e.g., based on EGR amount, differential pressure across the EGR valve, etc.) and may indicate any errors by incrementing a counter. In the present example, between t0 and t1, there may be a single EGR error that is identified by the EGR monitor and the counter may be accordingly incremented. However, due to the counter reading being lower than a threshold 311, no EGR degradation code may have been set.

At t1, lean engine operation may be requested and accordingly, the engine air-fuel ratio may be enleaned. Between t1 and t2, the engine air-fuel ratio may be operated leaner than stoichiometry, with a gradual enleanment of the air-fuel ratio. Herein, between t1 and t2, there may be a single EGR error that is identified by the EGR monitor and the counter may be accordingly incremented. However, due to the counter reading being lower than threshold 311, no EGR degradation code may have been set.

At t2, the combustion or exhaust air-fuel ratio may reach a lean threshold 303. As such, engine operation at an air-fuel ratio leaner than lean threshold 303 may lead to errors in EGR estimation and delivery. Specifically, due to the enleanment, there may be a significant amount of fresh air in the exhaust and therefore in the EGR. As a result, the intake oxygen sensor may read a gradually increasing oxygen concentration and accordingly infer a gradually decreasing engine dilution. Consequently, the EGR estimated based on the intake oxygen sensor output may be lower than the actual EGR delivered. EGR delivery control based on the incorrect EGR estimate may lead to incorrect spark and torque control, degrading engine performance. In addition, the EGR monitor may incorrectly diagnose EGR system errors more frequently and increment the counter faster.

To avoid these issues, at t2, in response to the exhaust air-fuel ratio being leaner than threshold 303, EGR may be disabled. For example, an EGR valve may be closed. As used herein, the EGR refers to low pressure EGR and the EGR valve refers to an EGR valve coupled in a low pressure EGR passage. As a result of the EGR disablement, incorrect EGR estimation is stopped. The controller may also set a flag at 310 to indicate that EGR has been disabled due to the presence of too much fresh air in the exhaust. In response to the flag being set, spark and torque control may be adjusted. In addition, the counter may be suspended such that the counter shows the same reading before and after t2.

In this way, issues associated with incorrect EGR estimation are reduced. Specifically, spark and torque control is improve, which improves engine drivability and fuel economy. In addition, issues associated with the misdiagnosis of an EGR system by an EGR monitor can be reduced. Specifically, an EGR system may not be flagged as degraded when it is actually functional. As such, this reduces costs associated with failed EGR monitors. By disabling EGR during conditions when false reading of EGR measurement is possible, vehicle performance is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while operating an engine with an air-fuel ratio adjusted to be leaner than stoichiometry, in response to exhaust air-fuel ratio being leaner than a threshold, closing an EGR valve; and
   in response to the exhaust air-fuel ratio being leaner than the threshold, suspending an EGR monitor, the EGR monitor including a delta pressure sensor and a counter.

2. The method of claim 1, wherein the exhaust air-fuel ratio is measured by an exhaust oxygen sensor.

3. The method of claim 1, wherein the threshold is based on engine speed and load.

4. The method of claim 1, wherein the threshold is increased as an engine speed and load increases.

5. The method of claim 1, further comprising opening the EGR valve when the exhaust air-fuel ratio is at or below the threshold.

6. The method of claim 1, wherein the engine is boosted, fueled via direct injection, and further comprises an exhaust manifold which includes a three-way catalyst.

7. The method of claim 6, wherein the exhaust air-fuel ratio is estimated by an exhaust oxygen sensor positioned upstream of the three-way catalyst.

8. The method of claim 1, further comprising, after closing the EGR valve, adjusting a valve timing to increase internal EGR.

9. The method of claim 8, wherein adjusting the valve timing includes one or more of advancing the timing of intake valve opening or retarding the timing of exhaust valve closing to increase valve overlap.

10. The method of claim 1, wherein the air-fuel ratio adjusted to be leaner than stoichiometry is a combustion air-fuel ratio of air and fuel combusting in a cylinder of the engine, the combustion initiated via spark-ignition.

11. The method of claim 10, wherein closing the EGR valve includes fully sealing the EGR valve against a seat of the EGR valve.

12. The method of claim 11, wherein the EGR valve is coupled to a low pressure EGR passage and wherein closing the EGR valve includes disabling low pressure EGR.

13. A method for an engine, comprising:
   operating the engine boosted by a turbocharger, the engine fueled via direct injection;
   flowing low pressure EGR;
   measuring low pressure EGR based on engine intake oxygen; and
   in response to an exhaust air-fuel ratio becoming leaner than a threshold based on engine speed and load, disabling the EGR; and
      while disabling the EGR, suspending a counter of an EGR monitor, the EGR monitor including a delta pressure sensor.

14. The method of claim 13, further comprising, estimating a flow rate of the flowing EGR via an intake oxygen sensor and measuring an exhaust oxygen content of the flowing EGR via an exhaust oxygen sensor.

15. The method of claim 13, wherein the threshold being based on the engine speed and load includes:
   estimating an EGR error upper limit that can be tolerated at the engine speed and load;
   estimating an air error upper limit based on the EGR error upper limit; and
   calculating the threshold based on the air error upper limit.

16. The method of claim 13, further comprising, while flowing low pressure EGR, incrementing the counter of the EGR monitor responsive to an indication of EGR error.

17. An engine system, comprising:
   an engine with an intake and an exhaust, the engine further having direct fuel injection;
   a turbocharger coupled to the engine with a turbocharger turbine and a turbocharger compressor;
   an EGR system including an EGR passage for recirculating exhaust residuals from the exhaust to the intake via an EGR valve, the EGR passage from downstream of the turbocharger turbine to upstream of the turbocharger compressor;
   an EGR monitor including a delta pressure sensor and a counter;
   an intake oxygen sensor coupled to the intake, upstream of an intake throttle and downstream of an outlet of the EGR passage, the intake oxygen sensor configured to estimate one or more of a combustion air-fuel ratio and EGR;
   an exhaust oxygen sensor coupled to the exhaust, upstream of an emission control device, the exhaust oxygen sensor configured to estimate an exhaust air-fuel ratio; and
   a controller with computer readable instructions for:
      flowing EGR based on engine speed and load;
      during the flowing, incrementing the counter in response to an indication of EGR system error; and
      in response to the exhaust air-fuel ratio rising above a lean threshold,
         closing the EGR valve; and
         suspending the counter.

18. The system of claim 17, wherein closing the EGR valve includes fully closing the EGR valve irrespective of a difference between EGR estimated by the intake oxygen sensor and a target EGR based on the engine speed and load.

19. The system of claim 18, wherein the controller includes further instructions for:
- after closing the EGR valve, adjusting engine cylinder valve timing to increase internal EGR, the adjusting cylinder valve timing including one or more of advancing timing of an intake valve opening and retarding timing of an exhaust valve closing to increase valve overlap.

\* \* \* \* \*